J. A. LEEN, Jr.
COMBINED CABLE CLAMP AND WIRE HOLDER.
APPLICATION FILED JULY 13, 1918.

1,408,750.

Patented Mar. 7, 1922.

WITNESS:
R. L. Hamilton

INVENTOR.
John A. Leen, Jr.
BY Chas. M. Girard
ATTORNEY

UNITED STATES PATENT OFFICE.

JOHN A. LEEN, JR., OF KANSAS CITY, MISSOURI.

COMBINED CABLE CLAMP AND WIRE HOLDER.

1,408,750.      Specification of Letters Patent.      Patented Mar. 7, 1922.

Application filed July 13, 1918. Serial No. 244,822.

*To all whom it may concern:*

Be it known that I, JOHN A. LEEN, Jr., a citizen of the United States, residing at Kansas City, in the county of Jackson, State of Missouri, have invented certain new and useful Improvements in Combined Cable Clamps and Wire Holders, of which the following is a full and exact specification.

The present invention relates to devices for supporting electric cables or conduits and the like from the walls or ceilings of buildings or other supporting structures, and one of the objects in view is to provide an improved means of securing cables of this character in position, and especially adapted for telephone work, where an auxiliary wire holder is required for suspending the branch or bridle wires leading off from the main cable or conduit.

In carrying out the invention I have provided an improved cable gripping device with which is associated an auxiliary wire holder adapted to support the branch wire and also to clamp the cable gripping device in its proper position.

It is also sought to devise a novel form of adjustable clamping or supporting member which is adapted to be readily and conveniently adjusted for accommodating the same to cables or conduits of varying sizes.

A further object is to provide an extremely simple and compact construction which may be manufactured at a minimum of expense.

With these general objects in view the invention will now be described with reference to the accompanying drawing illustrating a suitable form of construction which has been devised for embodying the improvements, after which the novel features therein will be set forth and defined in the appended claims.

In the drawing—

Figure 1:
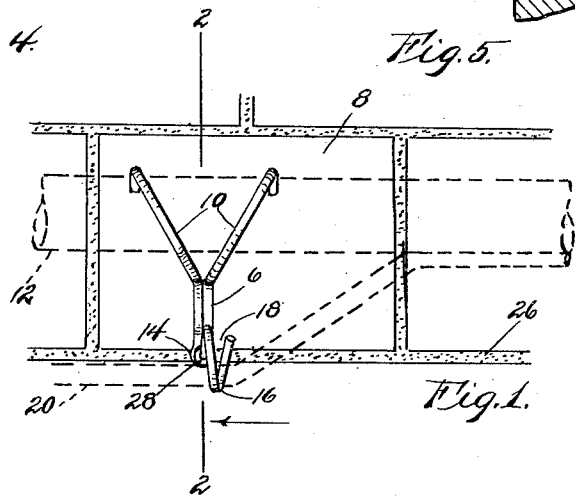
Figure 1 is a front elevation showing a portion of the face of a wall having a device embodying the present improvements applied thereto, with a cable and branch wire represented in broken lines.
Figure 2:
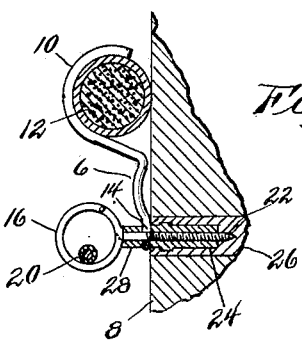
Figure 2 is a vertical section, taken on the line 2—2 of Figure 1.
Figure 3:
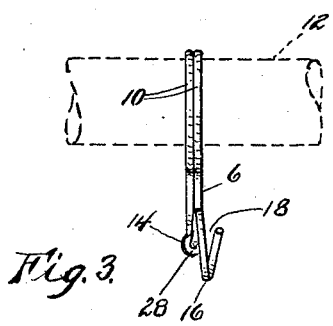
Figure 3 is a front view of the device, shown adjusted to fit a cable of larger diameter.

Referring to the drawing in detail, and more particularly to Figures 1 to 3, the cable clamping member is shown as constructed of a single piece of wire which is suitably bent upon itself to form a body portion 6 adapted to be placed in engagement with the face of a wall 8, the remaining or terminal portions of the wire being curved to form flexible fingers 10 adapted to grip a cable 12. With this construction said fingers 10 may be quickly and conveniently spread more or less to fit over different sizes of cables 12, Figure 1 representing the device with the fingers spread to grip a cable of relatively small diameter and Figure 3 showing the fingers pulled together to grip a cable of the maximum size for which the same are adapted.

Through the eye 14 at the lower end of the body portion 6 of the cable clamping member is passed the shank of a wire holder which comprises an outer wire receiving coil 16 of slightly more than one complete turn or convolution, the free terminal of which may be spread, as illustrated in Figures 1 and 3, to provide an opening or passage 18 sufficient for the insertion of a branch or bridle wire 20 leading off from the cable 12. The shank 22 of the wire holder is threaded to fit into the correspondingly threaded bore of an anchoring plug or sleeve 24 which is embedded in the wall 8, the drawing (Figures 1 and 2) showing said anchoring plug or sleeve embedded in one of the mortar courses 26 of the wall, the outer end of the plug coming flush with the outer surface of the wall. By this means the cable clamping member may be clamped into secure engagement with the face of the wall and the outer end of the plug or sleeve 24 by the action of the wire holder, and preferably I employ a collar 28 on the outer end of the shank next to the coil portion 16 for engagement with the eye 14 so as to space the coil portion 16 away from the wall and out of engagement with the cable clamping member and thereby leave the terminal portion of the coil free to move and allow the same to be readily spread in inserting the wire 20.

Figure 4:
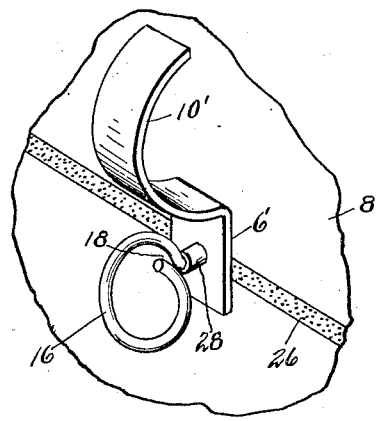
Figure 4 is a perspective view, on a larger scale, showing a modified form of cable clamping member.
Figure 5:
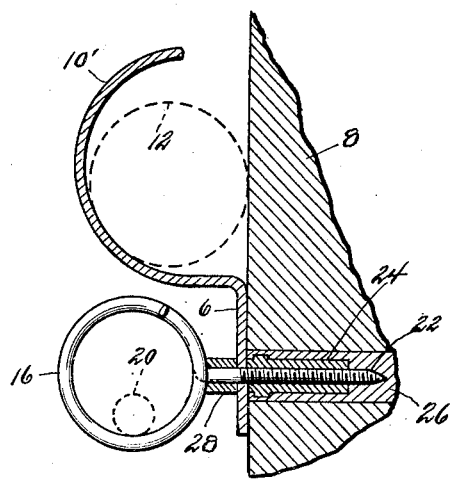
Figure 5 is a vertical sectional view of the same.

In Figures 4 and 5 are illustrated a modification in which the cable clamping member is simply constructed of sheet metal comprising the body or wall engaging portion 6' and the cable gripping portion 10', which modified form of construction may be preferred where a cable or conduit of uniform size is met with and no adjustment of the clamping member is needed. The other features of the construction and mode of securing to the wall 8 remain the same as illustrated in Figures 1 to 3.

It will thus be apparent that a simple, compact and efficient device has been provided for carrying out the desired objects of the invention, and the function and operation of the improvements will be readily understood from the foregoing. The structure of the cable supporting means adapts the same for ready and convenient adjustment to accommodate the particular size of cable carried thereby. The auxiliary wire holding coils are required and made use of as branch wires 20 are run off from the main cable or conduit 12. The combined arrangement and construction of the cable supporting member and auxiliary wire holding member affords a means for securing the parts to the wall properly and firmly without other fastening means of any kind, and the described anchoring structure has the advantage of providing a fixed embedded anchorage which does not disturb or loosen the mortar of the wall when the parts are tightened during the clamping operation as would be the case where an anchorage was effected by the mere action of the screw alone, without such a fixed anchoring member. By clamping the body portion 6 of the cable gripping member directly against the exposed end of the plug 24, the said body portion 6 is simply clamped positively between the collar 28 and the outer end of said plug with no appreciable drawing action being effected by the tightening of the screw which would tend to loosen the plug in the mortar or other material in which it is embedded. The use of the collar 28 provides an effective clamping element for co-operating with the outer end of the plug or sleeve 24 and also serves to leave the coil 16 out in convenient position for manipulation of the wire 20 on inserting it into said coil, and furthermore the presence of the collar 28 leaves the terminal of the said coil free to move to form the opening or passage 18 for said insertion of the wire.

While I have illustrated and described what I regard as the preferred form of construction for embodying the improvements, I desire to reserve the right to such changes or modifications as may fairly fall within the scope of the appended claims.

Having described the invention, what I claim as new and desire to secure by Letters-Patent, is:

1. A cable clamping device for fastening cables to walls and the like, comprising a clamping member having a wall engaging portion provided with means for securing the same to a wall, and cable engaging portions carried by said first portion and comprising a pair of curved flexible fingers adapted to be spread different distances apart lengthwise of the cable for gripping cables of different diameters, said securing means acting to hold said fingers in spring-clamping engagement with the cable.

2. A cable clamping device for fastening cables to walls and the like, comprising a single piece of wire bent upon itself to form a wall engaging portion provided with means for securing the same to a wall, and a pair of terminal finger portions adapted to be spread different distances apart lengthwise of the cable for gripping cables of different diameters, said securing means acting to hold said fingers in spring-clamping engagement with the cable.

In witness whereof I hereto affix my signature.

JOHN A. LEEN, Jr.